(12) United States Patent
Junkins et al.

(10) Patent No.: US 7,113,618 B2
(45) Date of Patent: Sep. 26, 2006

(54) PORTABLE VIRTUAL REALITY

(75) Inventors: Stephen Junkins, Bend, OR (US); Jason E. Plumb, Portland, OR (US); Fernando C. M. Martins, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 730 days.

(21) Appl. No.: 09/956,312

(22) Filed: Sep. 18, 2001

(65) Prior Publication Data
US 2003/0052965 A1   Mar. 20, 2003

(51) Int. Cl.
*G06K 9/00* (2006.01)

(52) U.S. Cl. .................. 382/107; 348/155; 348/169

(58) Field of Classification Search ............. 382/103, 382/107, 154, 294, 236, 276; 348/155, 156, 348/14.1, 97, 169, 208.1, 208.2, 208.13, 348/352, 402.1, 413.1, 431, 451, 452, 699, 348/700; 356/27; 345/629, 633; 73/864
See application file for complete search history.

(56) References Cited

U.S. PATENT DOCUMENTS

| | | | |
|---|---|---|---|
| 5,857,120 A * | 1/1999 | Konishi .................. | 396/51 |
| 5,900,849 A | 5/1999 | Gallery | |
| 6,009,210 A * | 12/1999 | Kang ..................... | 382/276 |
| 6,288,704 B1 | 9/2001 | Flack et al. | |
| 6,303,920 B1 * | 10/2001 | Wixson ................. | 250/208.1 |
| 6,330,356 B1 * | 12/2001 | Sundareswaran et al. ... | 382/154 |
| 6,333,749 B1 * | 12/2001 | Reinhardt et al. ......... | 345/629 |
| 6,434,265 B1 * | 8/2002 | Xiong et al. ............. | 382/154 |
| 6,597,818 B1 * | 7/2003 | Kumar et al. ............ | 382/294 |
| 6,798,897 B1 * | 9/2004 | Rosenberg .............. | 382/107 |
| 2003/0033150 A1 | 2/2003 | Balan et al. | |
| 2005/0041156 A1 | 2/2005 | Kondo et al. | |

OTHER PUBLICATIONS

Foxlin, Eric and Harrington, Michael, WearTrack: A Self-Referenced Head and Hand Tracker for Wearable COmputers and Portable VR, Wearable Computers, The Fourth International Symposium On, Atlanta, GA, USA Oct. 16-17, 2000, Los Alamitos, CA, USA, IEEE Comput. Soc., Oct. 16, 2000, pp. 155-162, XP10526005A, ISBN: 0-7695-0795-6/00.

Haase, H., et al., Meteorology meets computer graphics—a look at a wide range of weather visualisations for diverse audiences, Computers And Graphics, Pergamon Press Ltd., Oxford, GB, vol. 24, No. 3, Jun. 2000, pp. 391-397, XP4201702A, ISSN: 0097-8493/00, © 2000 Elsevier Science Ltd.

Klinker, G., et al., Distributed User Tracking Concepts for Augmented Reality Applications, Augumented Reality, 2000, (ISAR 2000) Proceedings, IEEE And ACM International Symposium On Munich, Germany Oct. 5-6, 2000, Piscataway, NJ, USA, IEEE, US, Oct. 5, 2000 pp. 37-44, XP10520308A, ISBN; 0-7695-0846-4/00.

(Continued)

*Primary Examiner*—Jingge Wu
*Assistant Examiner*—Abolfazl Tabatabai
(74) *Attorney, Agent, or Firm*—Blakely, Sokoloff, Taylor & Zafman LLP

(57) ABSTRACT

Portable virtual reality is disclosed. A digital camera captures an input video stream comprising video frames that carry information about a surrounding environment limited by a field of view of the camera. The input video stream is processed by a handheld computer coupled to the camera. Parameters that define a rendered scene of a virtual environment are adjusted based upon motion parameters extracted from the input video stream by the handheld computer during the processing.

32 Claims, 10 Drawing Sheets

OTHER PUBLICATIONS

Search Report for PCT/US 02/26894, mailed Jan. 9, 2003, 2 pages.

Barron, J.L., et al., Performance of Optical Flow Techniques; 0-8186-2855-3/92; ©1992 IEEE; pp. 236-242.

Bradski, Gary R., Real Time Face and Onject Tracking as a Component of a Perceptual User Interface; 0-8186-8606-5/98; © 1998 IEEE; pp. 214-219.

Darrell, Trevor, et al., Active Face Tracking and Pose Estimation in an Interactive Room; 1063-6919/96; © 1996 IEEE, pp. 67-72.

Hamburgen, William R., et al., Itsy: Stretching the Bounds of Mobile Computing; IEEE Computer, Apr. 2001, vol. 34, No. 4, http://computer.org/computer/homepage/april/comppract/cp.1htm; pp. 28-36.

Qian, Richard J., et al., A Robust Real-Time Face Tracking Algorithm; 0-8186-8821-1/98; © 1998 IEEE pp. 131-135.

Sawhney, Harpreet, S., et al., Model-Based 2D & 3D Dominant Motion Estimation for Mosaicing and Video Representation; 0-8186-7042-8/95; © 1995 IEEE, pp. 583-590.

Yang, Ming-Hsuan, et al., Face Recognition Using Kernel Eigenfaces; 0-7803-6297-7/00; © 2000 IEEE, pp. 37-40.

Window Managers for X; TWM Tab Window Manager; http://www.plig.org/xwinman/vtwm.html; 2 pages.

FVWM; Welcome to the Official FVWM Homepage; http://fvwm.org/;1 page.

\* cited by examiner

PORTABLE VIRTUAL REALITY

FIELD OF THE INVENTION

The invention relates to virtual reality systems generally and a portable virtual reality system in particular.

BACKGROUND

Virtual Reality (VR) systems have become commonplace in computer graphics research labs. This technology, however, has yet to achieve widespread consumer use. Most virtual reality systems employ specialized display systems such as "VR goggles", "VR helmets" and "heads-up displays" to achieve a greater sense of immersion into the virtual surroundings. Such a display system may be implemented as a helmet to continuously place a high-resolution display directly in front of a user's eyes. A system will also typically have a host processing system that is capable of delivering high performance 3D graphics at interactive frame rates.

The helmet can be equipped with a location and orientation tracking device. Such devices can produce a six dimensional description of the helmet wearer's approximate 3-space location and orientation. The six dimensions are recorded as position (x, y, z) and orientation (azimuth, elevation, roll). This information can be transmitted on the order of tens or hundreds of times per second to the host processor and used to dynamically update the 3D images being displayed in the helmet. The result is that when the user moves his head in the real world, the system displays an image that simulates the user moving his head in the virtual world. The system can give the user the sensation of being able to walk around and observe the virtual world. The interaction in the virtual world is "natural" because it is driven by natural movements in the physical world.

One technology for implementation employs a three-dimensional electromagnetic field emitter mounted in the ceiling. The helmet has a receiver that is able to read the magnetic field and determine the receiver's location and orientation. The receiver then sends this data to the host computer via a serial cable.

However, despite the advantages of current virtual reality technology, it has several drawbacks. First, restrictions in location are quite severe, dramatically limiting where the technology may be used. A virtual reality system typically requires a dedicated room to house the system and the electromagnetic field generators. Additionally, the display and tracking system often requires a fixed length cable to connect it to the host system that performs the display rendering and position processing. Therefore, such systems are inherently non-portable.

Another problem is that VR helmets can be physically uncomfortable. Many helmets are too heavy to be worn for long periods of time. Additionally, VR simulator sickness is a frequently reported problem. Proposed solutions to the simulator sickness problem entail giving the user a visual cue of the real world (either an overlaid small video window of the real world or synthetic objects that remain anchored with respect to the real world). Further, current display types often strain the user's eyes, as they require long periods of near distance focus. Also, many users are not prone to spending so much time immersed in a powerful electromagnetic field.

Lastly, there are social stigmas attached to wearing VR helmets. Helmet wearers may feel uncomfortable or strange wearing a heads-up display in front of other people. It is hard to see other people when wearing these devices, thereby reducing social contact. The converse is also true; people may feel uncomfortable interacting with persons wearing VR helmets.

DETAILED DESCRIPTION

Portable virtual reality is disclosed. In the following description, for purposes of explanation, numerous specific details are set forth in order to provide a thorough understanding of the invention. However, it will be apparent to one with ordinary skill in the art that these specific details need not be used to practice the present invention. In other instances, well-known structures and devices are shown in block diagram form in order to avoid unnecessarily obscuring the present invention.

A digital camera captures an input video stream comprising video frames that carry information about a surrounding environment limited by a field of view of the camera. The input video stream is processed by a handheld computer coupled to the camera. Parameters that define a rendered scene of a virtual environment are adjusted based upon motion parameters extracted from the input video stream by the handheld computer doing the processing. Implementation of this invention provides for a truly portable virtual reality (VR) system, it also eliminates the need of bulky and uncomfortable equipment that the user must wear. It also reduces social barriers associated with current VR technology. Lastly, the cost of the system is greatly reduced from that of current systems.

Figure 1:
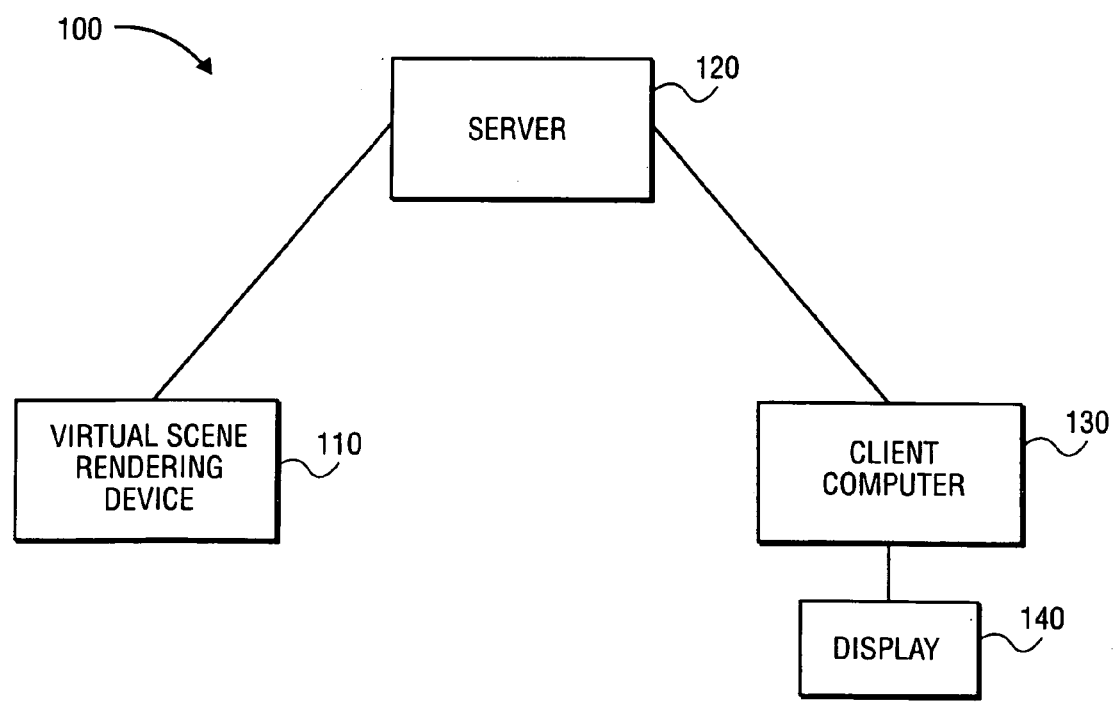
FIG. 1 is a diagram of a system-level overview of an embodiment of the invention.

FIG. 1 is a diagram of a system-level overview of an embodiment of the invention. Virtual scene rendering device 110 may comprise a digital camera for capturing an input video stream; the video stream comprising images, such images carrying information regarding the field of view of the digital camera, and a handheld computer coupled to the digital camera. In one embodiment, the handheld computer receives the input video stream from the digital camera and performs motion analysis of the input video stream. The handheld computer adjusts parameters relative to the rendering of the virtual environment based upon the motion analysis of the input video stream.

The virtual scene rendering device 110 may operate in a stand-alone or network environment, but the invention is not so limited. In one embodiment involving a network, the application is distributed among multiple processors. In another embodiment, the device 110 captures the input video stream. The processing of the video stream may be performed in the device 110 or on another processor, such as a processor in server 120, which is coupled to device 110 or a client computer 130, coupled to server 120. The virtual scene may be adjusted and rendered on a remote display, such as, a display 140 coupled to client computer 130. Such an application may be used to present a virtual scene to remote viewers, but the invention is not so limited.

Figure 2A:
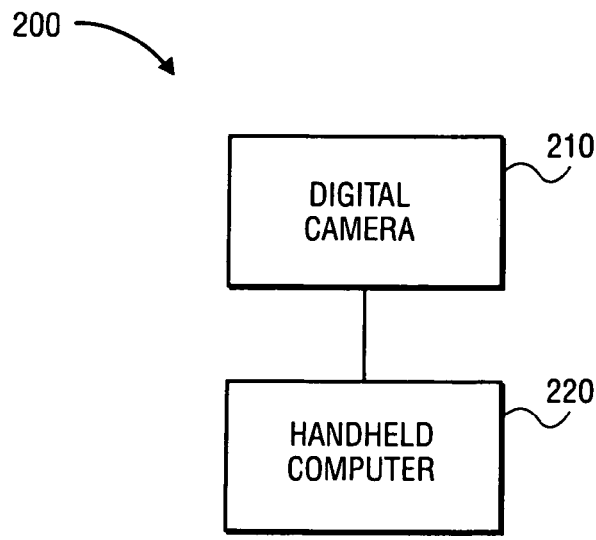
FIG. 2A is a block diagram of one embodiment of a virtual scene rendering device according to the present invention.
Figure 2B:
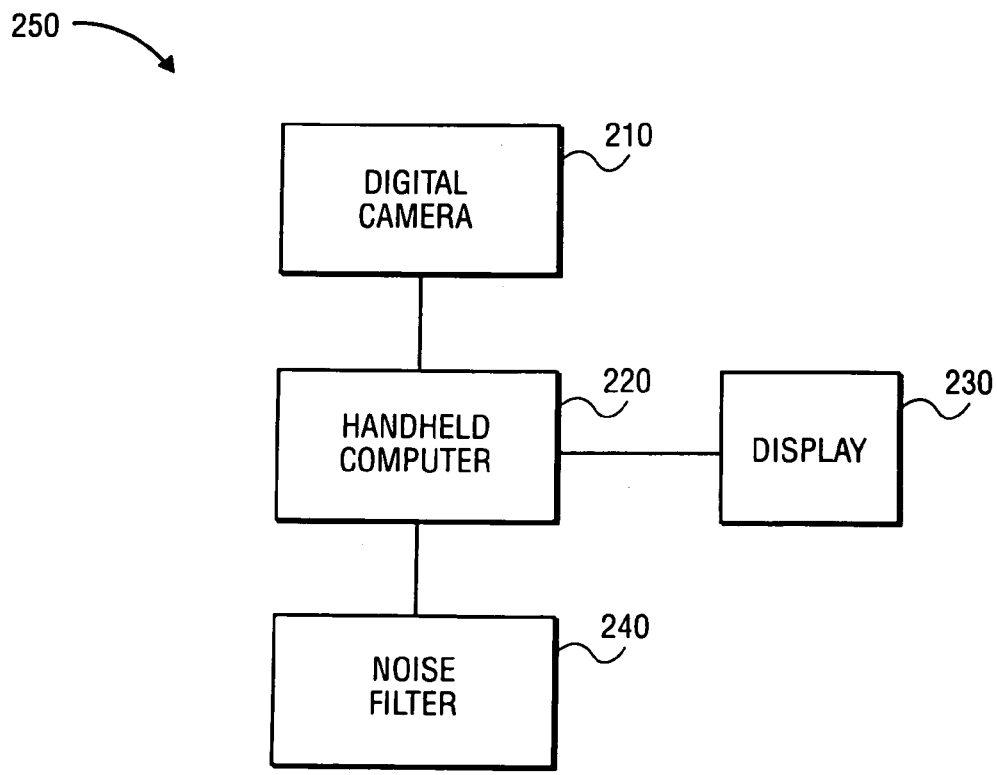
FIG. 2B is a block diagram of another embodiment of a virtual scene rendering device.
Figure 2C:
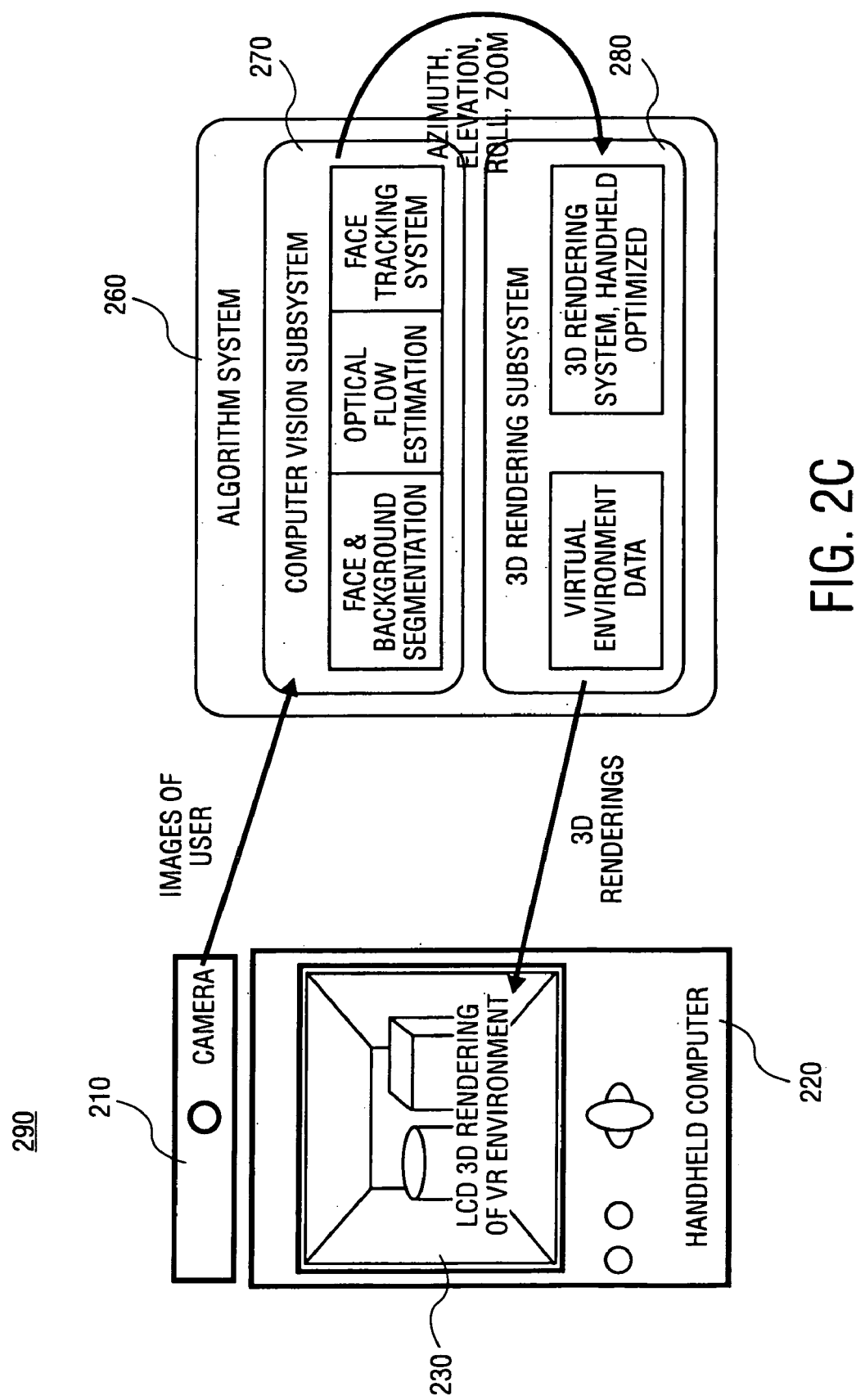
FIG. 2C is a block diagram of yet another embodiment of a virtual scene rendering device.

In alternative embodiments, the virtual scene rendering device 110 may be a device such as device 200 of FIG. 2A or device 250 of FIG. 2B or device 290 of FIG. 2C.

FIG. 2A is a block diagram of one embodiment of a virtual scene rendering device according to the present invention. Digital camera 210 captures an input video stream comprising images of a surrounding environment limited by a field of view of the digital camera. Handheld computer 220 is coupled to digital camera 210, to receive the input video stream from digital camera 210 and to perform motion analysis of the input video stream. Handheld computer 220 adjusts a rendered scene of a virtual environment based upon the motion analysis of the input video stream.

FIG. 2B is a block diagram of another embodiment of a virtual scene rendering device. Display 230 is coupled to handheld computer 220. In one embodiment, display 230 is a component of handheld computer 220. In another embodiment, display 230 is any state of the art handheld computer display, such as for example, a liquid crystal display (LCD). Noise filter 240 may also be coupled to handheld computer 220. Noise filter 240 may filter noise from the input video stream before a virtual scene is rendered. Noise filtering may be necessary to reduce the effect of shaking of the device in the user's hand.

Image frames in the input video stream convey information about the fraction of the surrounding environment visible through the field of view of the camera. The handheld computer 220 processes the input video stream to obtain data regarding visual motion. A scene of a virtual environment may be continuously rendered on the display 230. A viewpoint used to adjust the virtual scene is defined according to motion parameters extracted from the input video stream. The motion of the scene rendering device 250 drives the adjusting and rendering of the virtual scene.

FIG. 2C is a block diagram of yet another embodiment of a virtual scene rendering device. Algorithm system 260 provides an interface between digital camera 210 and handheld computer 220. Within algorithm system 260 is computer vision subsystem 270. Computer vision subsystem 270 performs motion analysis of the input video stream. Computer vision subsystem 270 may use face and background segmentation, optical flow estimation and/or face tracking to perform the motion analysis. Rendering subsystem 280, also within algorithm system 260, receives output from computer vision subsystem 270, such as commands to adjust for azimuth, elevation, roll or zoom, and adjusts the rendered scene displayed on the display 230 based upon the output. In one embodiment, images of a user are captured by digital camera 210 and received by computer vision subsystem 270. 3-D rendering subsystem 280 receives motion analysis information from computer vision subsystem 270 and renders the virtual scene on display 230.

Figure 3:
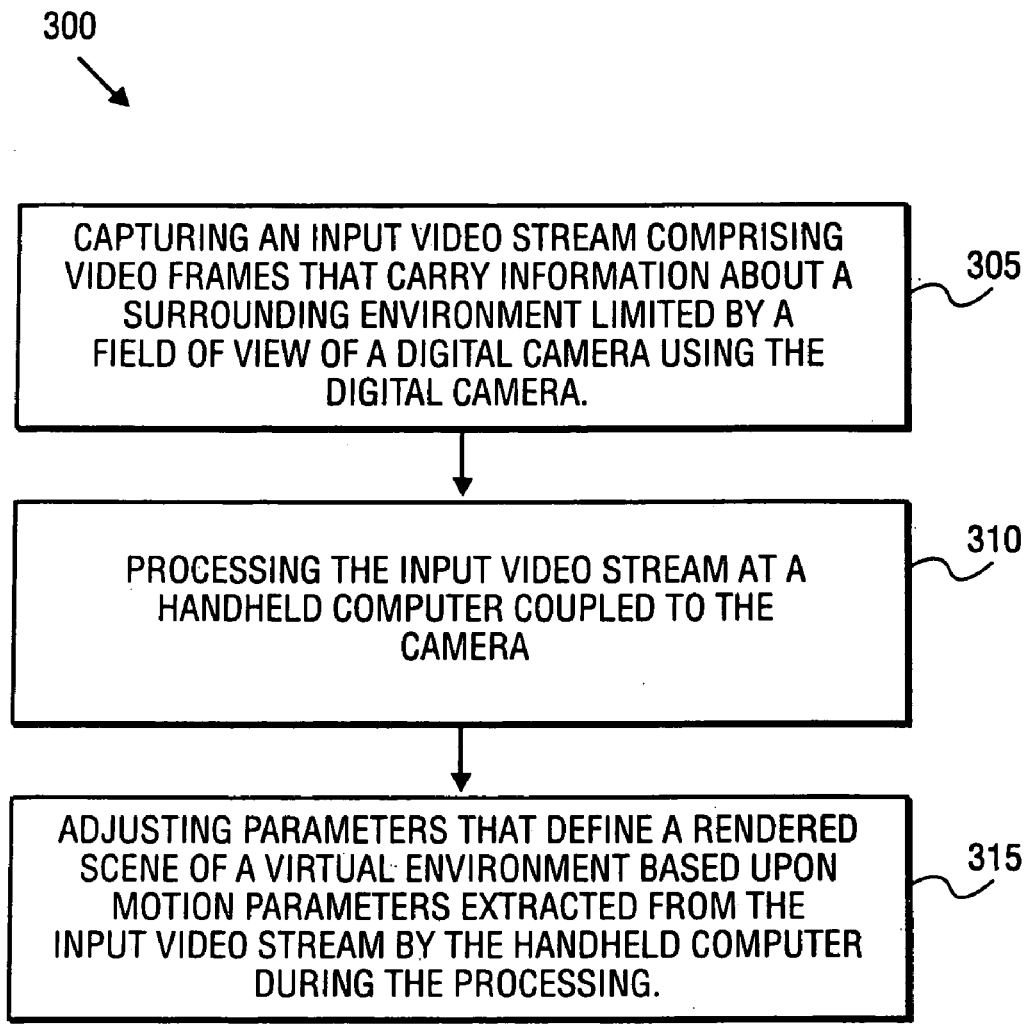
FIG. 3 is a flow diagram of a method to be performed by a computer according to an embodiment of the present invention.

FIG. 3 is a flow diagram of a method to be performed according to an embodiment of the present invention. At block 305, a digital camera captures an input video stream comprising video frames that carry information about a surrounding environment limited by a field of view of the camera. In one embodiment, the video frames comprise images of the surrounding environment. At block 310, the handheld computer coupled to the digital camera processes the input video stream. At block 315, parameters that define a rendered scene of a virtual environment are adjusted based upon motion analysis information (motion parameters) extracted from the input video stream by the handheld computer during the processing.

Figure 4:
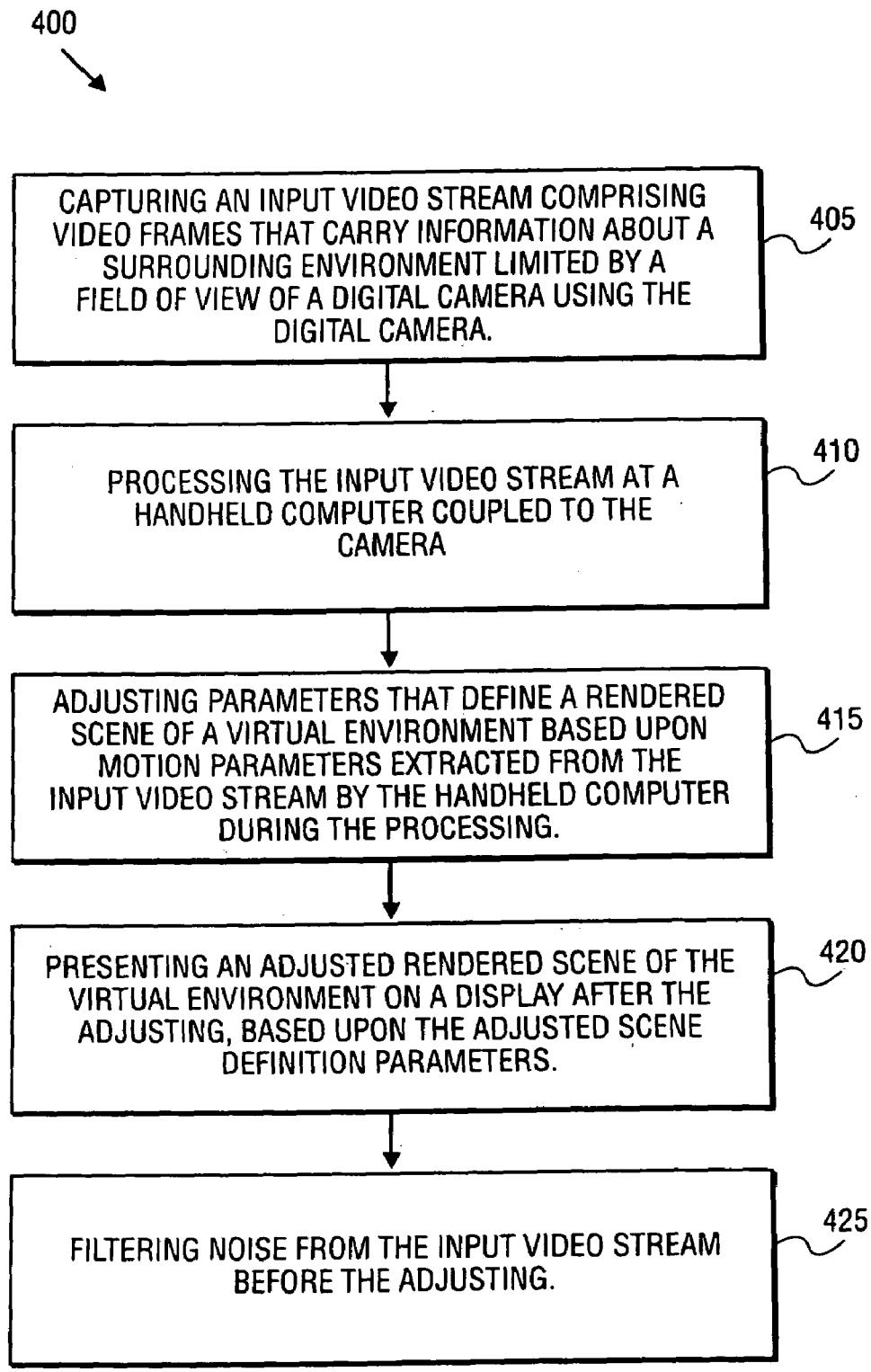
FIG. 4 is a flow diagram of a method to be performed by a computer according to an alternate embodiment of the present invention.

FIG. 4 is a flow diagram of a method to be performed according to an alternate embodiment of the present invention. At block 405, a digital camera captures the input video stream comprising video frames carry information about the environment constrained by the field of view of the camera. At block 410, the input video stream is received and processed by the handheld computer coupled to the camera. At block 415, parameters that define a rendered scene of a virtual environment are adjusted based upon motion analysis information extracted from the input video stream by the handheld computer. In one embodiment, the adjusting comprises rendering. At block 420, the rendered scene of the virtual environment is presented to a user on a display, based upon the adjusted scene definition parameters. At block 425, noise is filtered from the input video stream before analysis and rendering is performed.

Figure 5A:
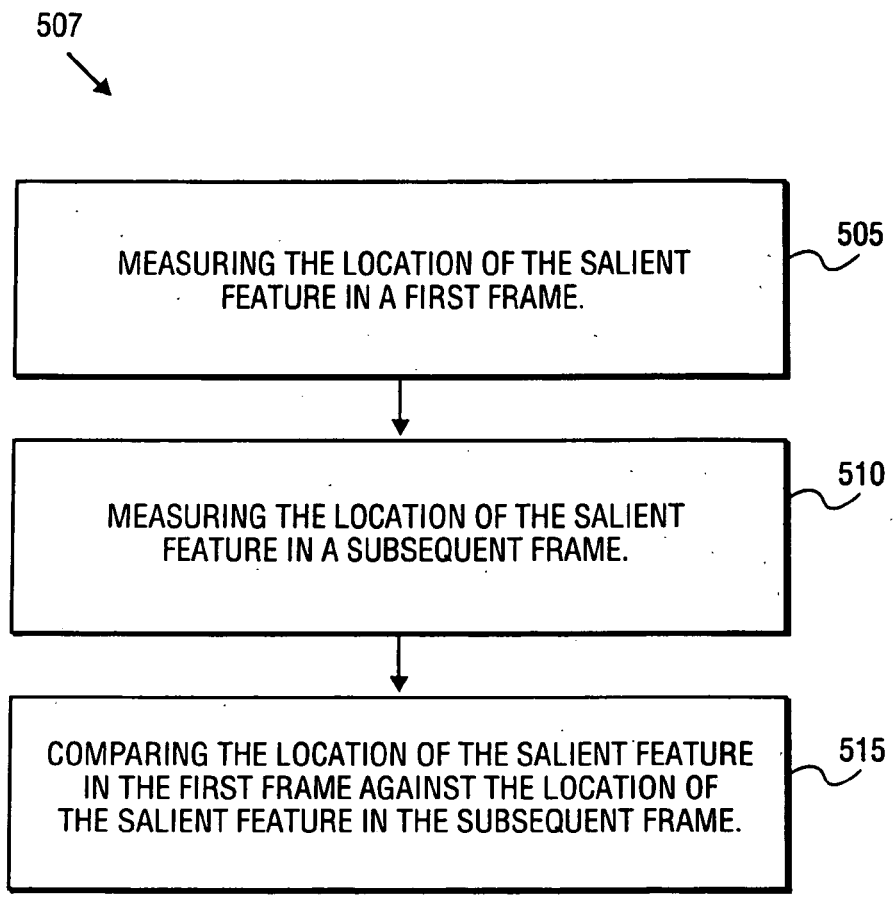
FIGS. 5A–5D are flow diagrams of embodiments of motion analysis methods to be performed according to alternate embodiments of the present invention.

FIGS. 5A–5D are flow diagrams of embodiments of distinct motion analysis methods to be performed according to alternate embodiments of the present invention. In the embodiment of FIG. 5A, the motion analysis is performed by tracking the location of a salient feature or features across the input video stream. At block 505, the location of the salient features is determined in a first image frame. At block 510, the location of the salient features is determined for a subsequent image frame. At block 515, the motion of the salient feature is estimated as a function of the evolution of the location of the features over time.

Figure 5B:
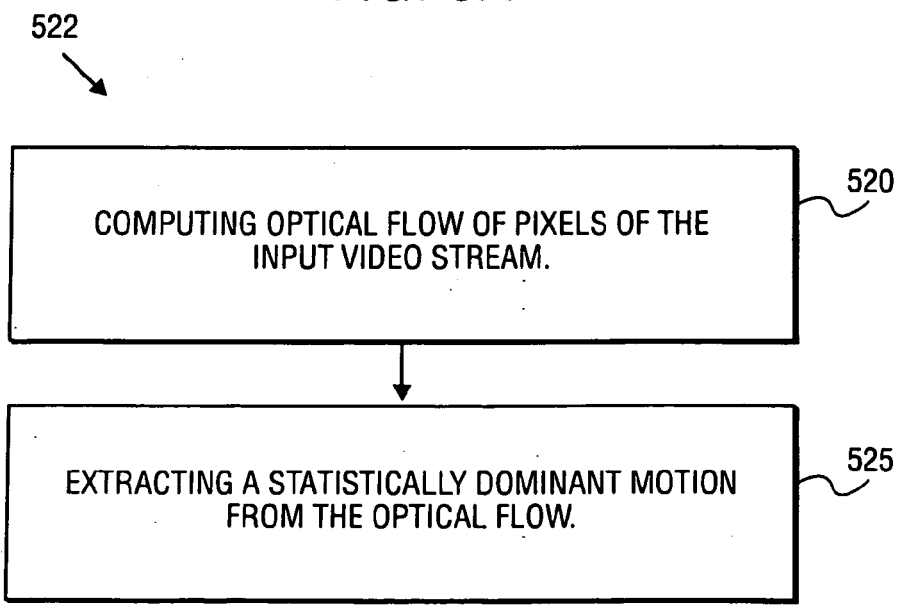

FIG. 5B shows another embodiment, where the motion analysis is implemented by computing the principal motion of the optical flow of the input video stream. At block 520, optical flow of pixels of the input video stream is computed. At block 525, a statistically dominant motion is extracted from the optical flow. The extraction of the statistically dominant motion may comprise caching results of optical flow computations for multiple image frames of the input video stream and performing principal component analysis on the cached results to determine the statistically dominant motion. In another embodiment, the motion analysis is restricted to the principal motion of the background area in the image as the user moves the handheld computer. Separation of the user's face from the background area allows for robustness in overall motion estimation.

Figure 5C:
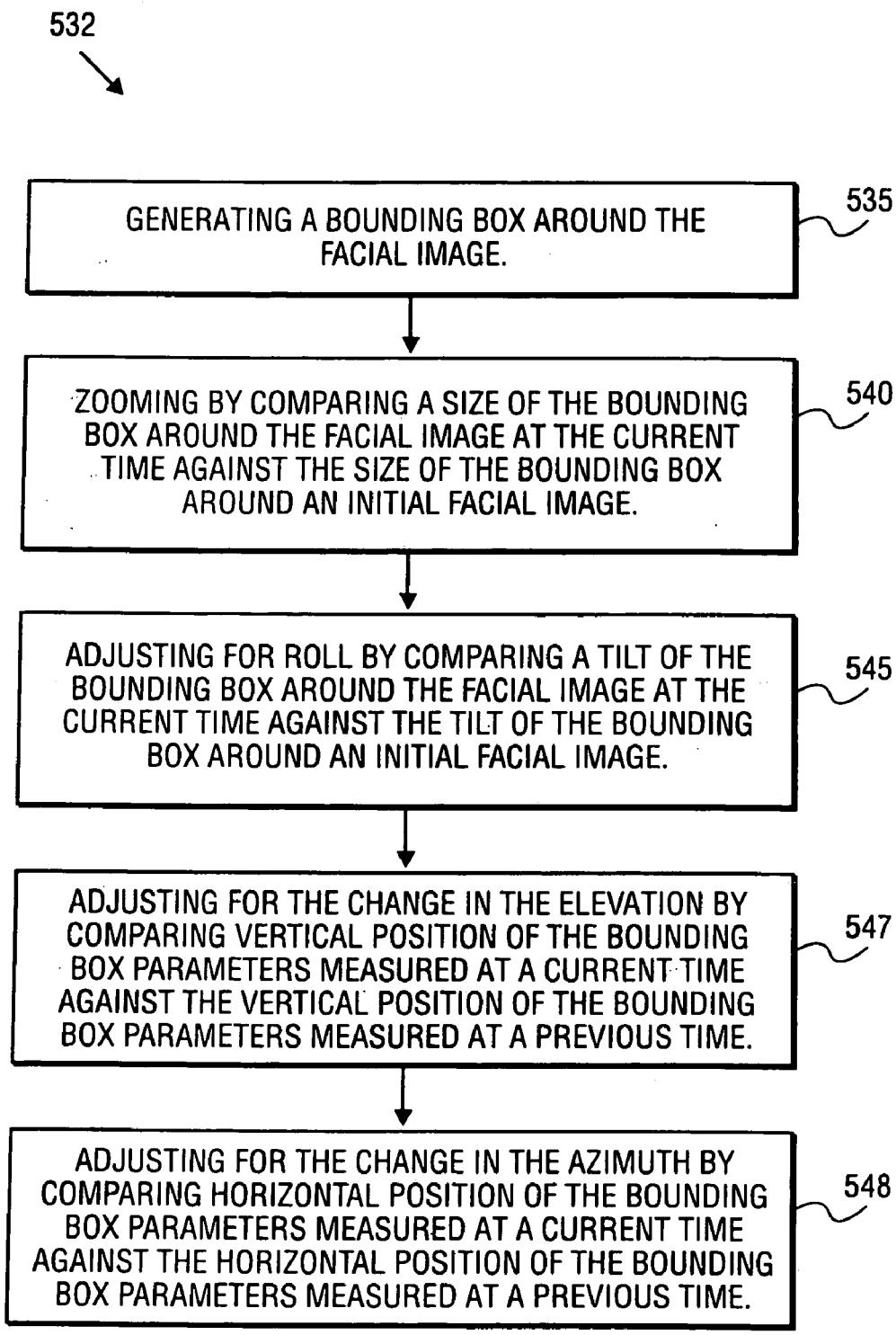

FIG. 5C shows an alternate embodiment that adjusts the rendered scene based upon facial motion. At block 530, parameters which describe a facial image of the user are measured. At block 535, a bounding box is generated around the facial image. A bounding box is an invisible rectangle placed around an on screen object or image. The bounding box may be defined by bounding box parameters. At block 540, a zooming operation is performed by comparing a size of the bounding box around the facial image at a current time against the size of the bounding box around an initial facial image. At block 545, an adjustment for roll is made by comparing a tilt of the bounding box around the facial image at a current time against the tilt of the bounding box around an initial facial image. At block 547, an adjustment for change in elevation is made by comparing vertical position of the bounding box measured at a current time against the vertical position of the bounding box measured at a previous time. At block 548, an adjustment for change in azimuth is made by comparing the horizontal position of the bounding box at a current time against the horizontal position of the bounding box around at a previous time.

Figure 5D:
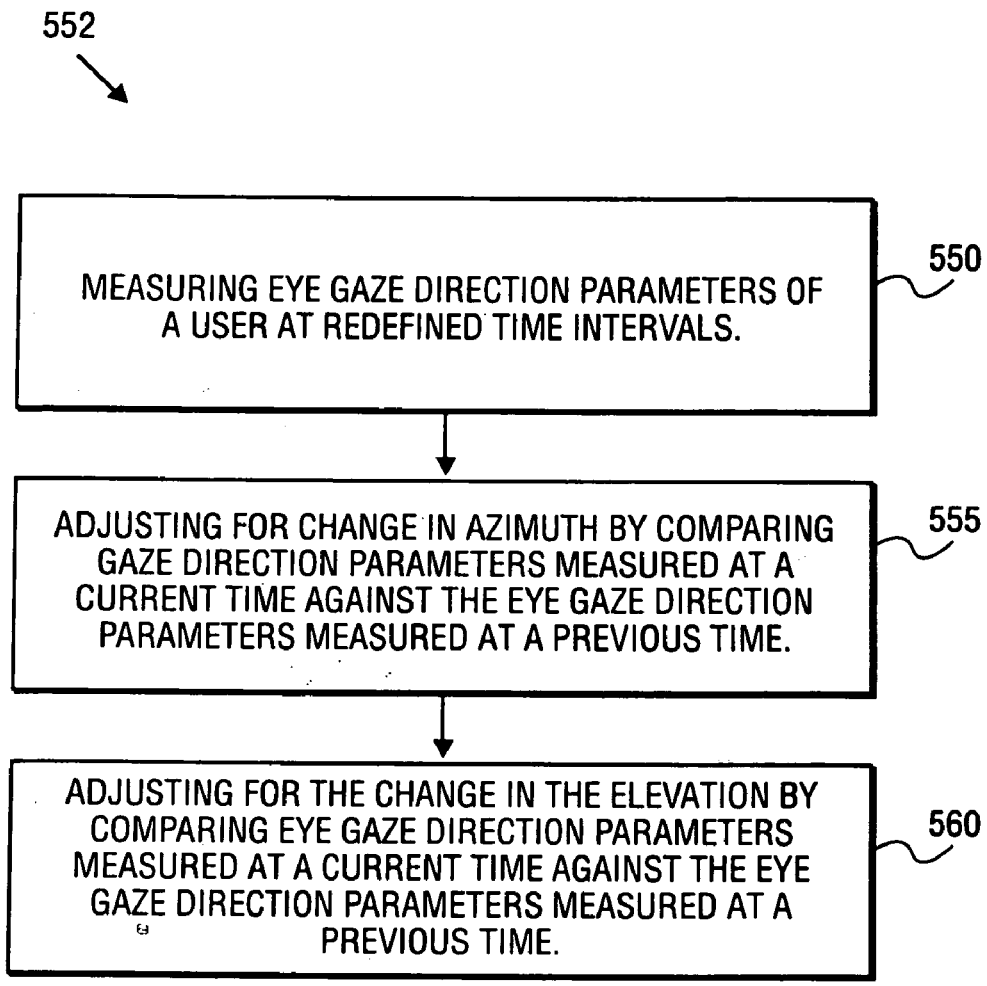

FIG. 5D shows an alternate embodiment that adjusts the rendered scene based upon eye gaze direction of the user. At block 550, eye gaze direction parameters are measured at predefined time intervals. The eye gaze direction parameters may include estimated vertical and horizontal eye gaze angles, but the invention is not so limited. At block 555, an adjustment for change in azimuth is made by comparison of the horizontal eye gaze angle measured at a current time against the horizontal eye gaze angle measured at a previous time. At block 560, an adjustment for change in elevation is made by comparison of the vertical eye gaze angle measured at a current time against the horizontal eye gaze angle measured at a previous time.

Figure 6:
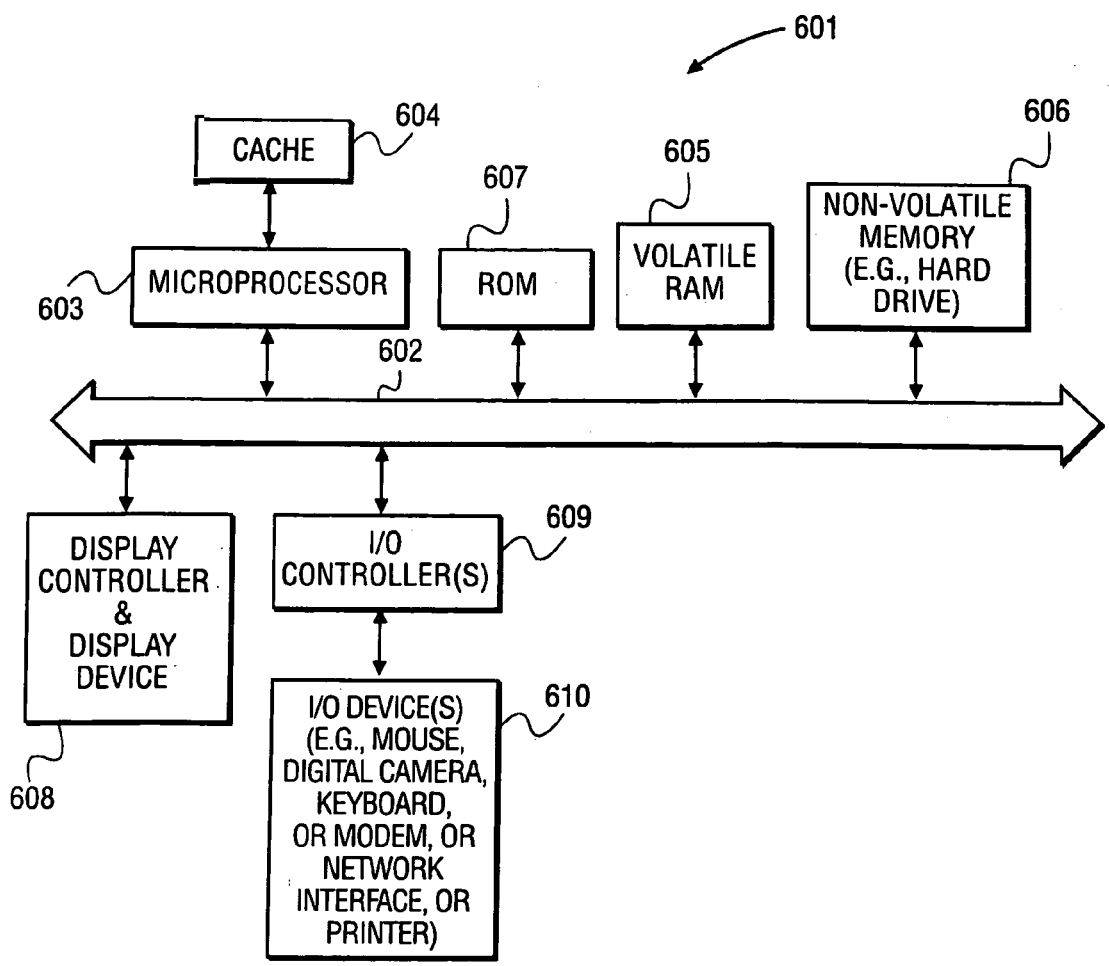
FIG. 6 is a diagram of an operating environment suitable for practicing the present invention.

FIG. 6 shows one example of a typical computer system that may be used to implement the present invention. Note that while FIG. 6 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 6, the computer system 601, which is a form of a data processing system, includes a bus 602 which is coupled to a microprocessor 603 and a ROM 607 and volatile RAM 605 and a non-volatile memory 606. The microprocessor 603 is coupled to cache memory 604 as shown in the example of FIG. 6. The bus 602 interconnects these various components together and also interconnects these components 603, 604, 605, and 606 to a display controller and display device 608 and to peripheral devices such as input/output (I/O) devices which may be digital cameras, mice, keyboards, modems, network interfaces, printers and other devices which are well known in the art. Typically, the input/output devices 610 are coupled to the system through input/output controllers 609. The volatile RAM 605 is typically implemented as dynamic RAM (DRAM), which requires power continually in order to refresh or maintain the data in the memory. The non-volatile memory 606 is typically a magnetic hard drive or a magnetic optical drive or an optical drive or a DVD RAM or other types of memory systems that maintain data even after power is removed from the system. Typically, the non-volatile memory will also be a random access memory although this is not required. While FIG. 6 shows that the non-volatile memory 606 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 602 may include one or more buses connected to each other through various bridges, controllers and/or adapters as are well known in the art. In one embodiment the I/O controller 609 includes a USB (Universal Serial Bus) adapter for controlling USB peripherals.

It will be apparent from this description that aspects of the present invention may be embodied, at least in part, in machine-executable instructions, e.g. software. That is, the techniques may be carried out in a computer system or other data processing system in response to its processor, such as a microprocessor, executing sequences of instructions contained in a memory, such as ROM 607, volatile RAM 605, non-volatile memory 606, cache 604 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 603.

Figure 7:
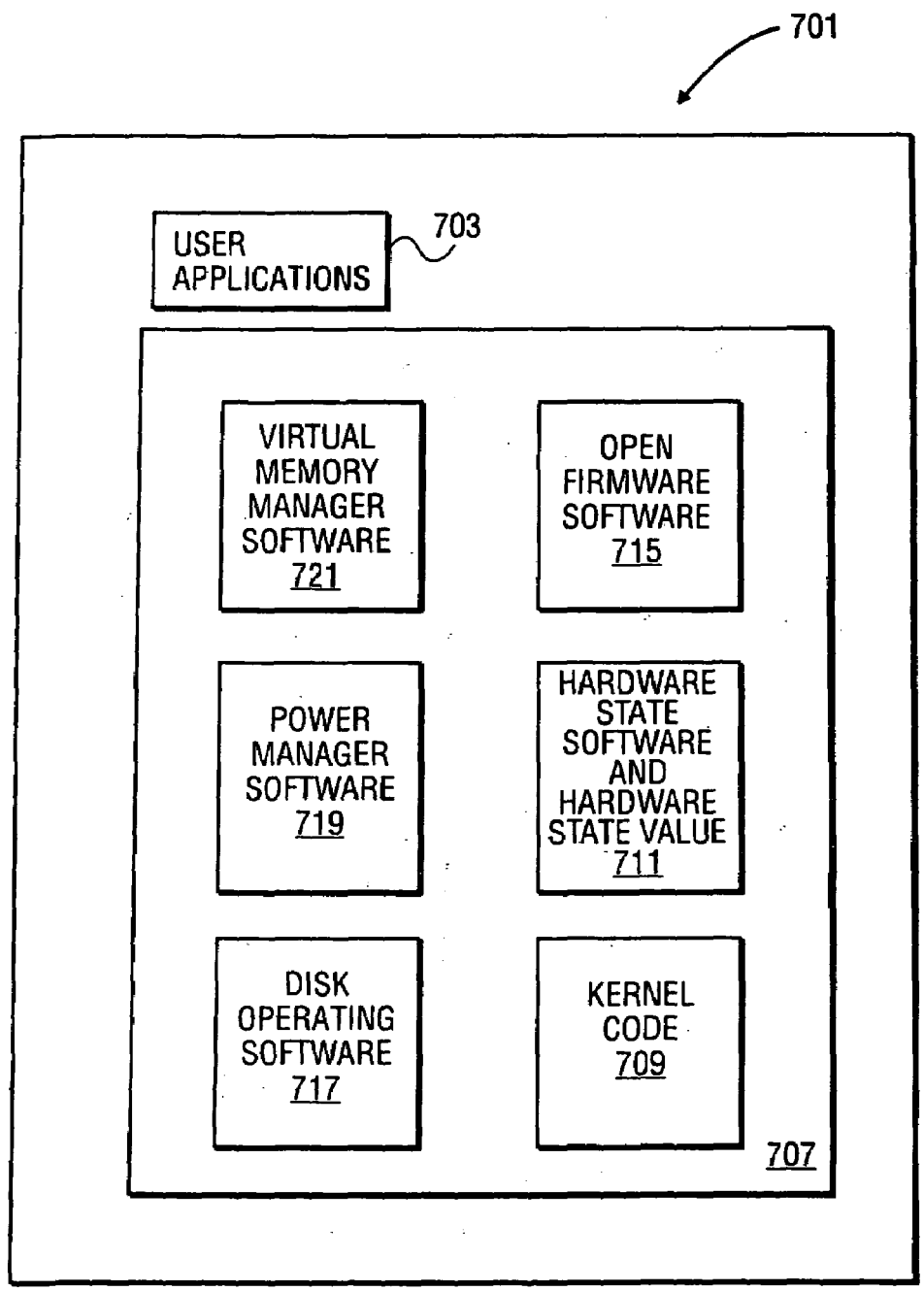
FIG. 7 is a diagram of a computer readable media, which may be used within an operating environment, such as the operating environment of FIG. 6, according to one embodiment of the present invention.

FIG. 7 shows an example of a computer readable media, which may be used with the data processing system according to one embodiment of the present invention. The computer readable media contains data and executable software which when executed in the data processing system such as a digital processing system cause the system to perform the various methods of the present invention. As noted above, this executable software and data may be stored in various places including for example the ROM 607, the volatile RAM 605, the non-volatile memory 606 and/or the cache 604. Portions of this software and/or data may be stored in any one of these storage devices. The media 701 for example may be primarily the volatile RAM 605 and the non-volatile memory 606 in one embodiment. The user applications 703 represent software applications, which are executing on the computer system, such as a word processing application or a spreadsheet application, an Internet web browser application, or a virtual scene rendering application. The operating system 707 includes the Open Firmware software 715 which may be stored in the ROM 607 and loaded into RAM 605 at boot up. The hardware state software and hardware state value 711 is the software which generates the hardware state value. The kernel code 709 represents the kernel of the operating system and performs numerous tasks. The virtual memory manager software 721 controls the virtual memory process. This typically involves maintaining a map of page data, which represents the state of data in all the virtual memory, which includes the physical RAM such as volatile RAM 605 and a portion of the non-volatile memory 606 which has been designated as part of the virtual memory of the system. The virtual memory manager software will be performing conventional virtual memory processes as is known in the art. The power manager software 719 performs the various power managing operations such as notifying applications and the system and drivers of changes to the power consumption state of the system. The software may also monitor the state of a computer battery to determine whether sufficient power exists to continue to operate and displays alerts to the user indicating the status of the battery and the power status of the system. The disk operating system software 717 performs the conventional functions of a disk operating system. This typically includes controlling the operation of a hard disk drive, which in many examples is the non-volatile memory 606 which serves as a virtual memory for the volatile RAM 605.

It will be further appreciated that the instructions represented by the blocks in FIGS. 3–5D are not required to be performed in the order illustrated, and that all the processing represented by the blocks may not be necessary to practice the invention.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method in a virtual reality system comprising:
   capturing an input video stream using a digital camera, the input video stream comprising video frames that carry information about a surrounding environment limited by a field of view of the digital camera;
   processing the input video stream at a handheld computer coupled to the digital camera to extract data regarding visual motion of the digital camera; and
   adjusting visual motion of a rendered scene of a virtual environment based on the data extracted from the input video stream by the handheld computer, wherein the adjusted visual motion of the rendered scene of the virtual environment corresponds to the visual motion of the digital camera.

2. The method of claim 1, further comprising presenting an adjusted rendered scene of the virtual environment on a display after the adjusting, based upon the adjusted scene definition parameters.

3. The method of claim 1, further comprising filtering noise from the input video stream before the adjusting.

4. The method of claim 1, wherein the extraction of the motion parameters comprises tracking a location of a salient feature across the input video stream.

5. The method of claim 4, wherein the tracking of the location of the salient feature further comprises:
   measuring the location of the salient feature in a first frame;
   measuring the location of the salient feature in a subsequent frame; and
   comparing the location of the salient feature in the first frame against the location of the salient feature in the subsequent frame.

6. The method of claim 1, wherein the extraction of the motion parameters comprises principal motion analysis of the input video stream, the principle motion analysis comprising:
   computing optical flow of pixels of the input video stream; and
   extracting a statistically dominant motion from the optical flow.

7. The method of claim 6, wherein the extracting of a statistically dominant motion further comprises:
   caching results of the computing of the optical flow of pixels for multiple image frames of the input video stream; and
   performing principal component analysis of the cached results to determine the statistically dominant motion.

8. The method of claim 6, wherein computing the optical flow of pixels comprises determining a relative motion of a background area image with respect to the handheld computer as the user moves the handheld computer.

9. The method of claim 1, wherein the extraction of the motion parameters comprises tracking motion of a user's facial image.

10. The method of claim 9, wherein the motion tracking further comprises generating a bounding box, defined by bounding box parameters, around the facial image.

11. The method of claim 10, wherein the adjusting comprises zooming, the zooming determined by comparing a size of the bounding box around the facial image at the current time against the size of the bounding box around an initial facial image.

12. The method of claim 10, wherein the adjusting comprises adjusting for roll, the adjusting for roll determined by comparing a tilt of the bounding box around the facial image at the current time against the tilt of the bounding box around an initial facial image.

13. The method of claim 10, wherein the adjusting comprises adjusting for change in elevation, the adjusting for the change in the elevation determined by comparing vertical position of the bounding box parameters measured at a current time against the vertical position of the bounding box parameters measured at a previous time.

14. The method of claim 10, wherein the adjusting comprises adjusting for change in azimuth, the adjusting for the change in the azimuth determined by comparing horizontal position of the bounding box parameters measured at a current time against the horizontal position of the bounding box parameters measured at a previous time.

15. The method of claim 1, wherein the extraction of the motion parameters comprises measuring eye gaze direction parameters of a user at predefined time intervals.

16. The method of claim 15, wherein adjusting comprises adjusting for change in azimuth, the adjusting for change in azimuth determined by comparing a horizontal eye gaze angle measured at a current time against the horizontal eye gaze angle measured at a previous time.

17. The method of claim 15, wherein the adjusting comprises adjusting for change in elevation, the adjusting for the change in the elevation determined by comparing a vertical eye angle measured at a current time against the vertical eye gaze angle measured at a previous time.

18. An apparatus comprising:
   a digital camera to capture an input video stream, comprising video frames that carry information about a surrounding environment limited by a field of view of the digital camera; and
   a handheld computer coupled to the digital camera, the handheld computer to process the input video stream to extract data regarding visual motion of the digital camera, and
   adjust visual motion of a rendered scene of a virtual environment based on the data extracted from the input video stream by the handheld computer, wherein the adjusted visual motion of the rendered scene of the virtual environment corresponds to the visual motion of the digital camera.

19. The apparatus of claim 18, further comprising a display that displays the rendered scene of the virtual environment.

20. The apparatus of claim 19, wherein the display is a component of the handheld computer.

21. The apparatus of claim 18, wherein the motion analysis comprises principal motion analysis of the input video stream, the principal motion analysis comprising:
   computing optical flow of pixels of the input video stream, and
   extracting a statically dominant motion from the optical flow.

22. The apparatus of claim 18, wherein the motion analysis comprises tracking facial motion.

23. A machine-readable medium having stored thereon sets of instructions, which when executed by a machine, cause the machine to:
- capture an input video stream using a digital camera, the input video stream comprising video frames that carry information about a surrounding environment limited by a field of view of the digital camera;
- process the input video stream at a handheld computer coupled to the digital camera to extract data regarding visual motion of the digital camera; and
- adjust parameters that define a rendered scene of a virtual environment based on the data extracted from the input video stream by the handheld computer, wherein the adjusted visual motion of the rendered scene of the virtual environment corresponds to the visual motion of the digital camera.

24. The machine-readable medium of claim 23, wherein the extraction of the motion parameters comprises tracking a location of a salient feature across the input video stream.

25. The machine-readable medium of claim 23, wherein the extraction of the motion parameters comprises pixel flow analysis comprising:
- computing optical flow of pixels of the input video stream; and
- extracting a statistically dominant motion from a trend in the optical flow.

26. A system comprising:
- a processing unit in a handheld computer;
- a memory coupled to the processing unit through a bus; and
- a virtual scene rendering process executed from the memory by the processing unit to
  - capture an input video stream using a digital camera, the input video stream comprising video frames that carry information about a surrounding environment limited by a field of view of the digital camera,
  - process the input video stream to extract data regarding visual motion of the digital camera, and
  - adjust visual motion of a rendered scene of a virtual environment based on the data extracted from the input video stream by the handheld computer, wherein the adjusted visual motion of the rendered scene of the virtual environment corresponds to the visual motion of the digital camera.

27. The system of claim 26, wherein the extraction of the motion parameters comprises principal motion analysis of the input video stream, the principal motion analysis comprising:
- computing optical flow of pixels of the input video stream; and
- extracting a statistically dominant motion from the optical flow.

28. The system of claim 26, wherein the extraction of the motion parameters comprises tracking facial motion.

29. A system comprising:
- a virtual scene rendering device comprising a digital camera to capture an input video stream comprising video frames that carry information about a surrounding environment limited by a field of view of the digital camera and handheld computer coupled to the digital camera;
- a server communicatively coupled to the virtual scene rendering device; and
- a client computer communicatively coupled to the server, the client computer to
- process the input video stream to extract data regarding visual motion of the digital camera,
  - adjust visual motion of a rendered scene of a virtual environment based on the data extracted from the input video stream, wherein the adjusted visual motion of the rendered scene of the virtual environment corresponds to the visual motion of the digital camera, and
  - distribute the virtual scene between the virtual scene rendering device, the server and the client computer.

30. The system of claim 29, wherein an adjusted rendered scene of the virtual environment is presented on a display coupled to the client computer, based upon the adjusted scene definition parameters.

31. The system of claim 29, wherein the motion analysis comprises tracking a location of a salient feature across the input video stream.

32. The system of claim 29, wherein the motion analysis comprises principal motion analysis of the input video stream, the principal motion analysis comprising:
- computing optical flow of pixels of the input video stream; and
- extracting a statistically dominant motion from a trend in the optical flow.

* * * * *